United States Patent
Waggett (10) Patent No.: US 9,720,916 B2
(45) Date of Patent: Aug. 1, 2017

(54) TWO-DIRECTIONAL BIOMETRIC MATCHING

(71) Applicant: International Business Machines Corporation, Armonk, NY (US)

(72) Inventor: Peter W. Waggett, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 14/255,191

(22) Filed: Apr. 17, 2014

(65) Prior Publication Data

US 2014/0344260 A1 Nov. 20, 2014

(30) Foreign Application Priority Data

May 14, 2013 (GB) .................................. 1308638.4

(51) Int. Cl.
- *G06F 17/30* (2006.01)
- *G06F 21/32* (2013.01)
- *G06Q 20/40* (2012.01)

(52) U.S. Cl.
CPC .... *G06F 17/30032* (2013.01); *G06F 17/3028* (2013.01); *G06F 21/32* (2013.01); *G06Q 20/40145* (2013.01)

(58) Field of Classification Search
USPC .................................................. 707/706, 723
See application file for complete search history.

(56) References Cited

U.S. PATENT DOCUMENTS

| 7,277,891 | B2 | 10/2007 | Howard et al. | |
| 7,725,732 | B1* | 5/2010 | Ballard | H04L 9/3231 713/186 |
| 7,962,467 | B2* | 6/2011 | Howard | G06K 9/00006 707/706 |
| 8,184,880 | B2 | 5/2012 | Zhao et al. | |
| 2003/0215114 | A1* | 11/2003 | Kyle | G06F 21/32 382/115 |
| 2010/0177955 | A1 | 7/2010 | Simakov et al. | |

(Continued)

FOREIGN PATENT DOCUMENTS

| CN | 102017509 A | 4/2011 |
| EP | 2479710 A1 | 7/2012 |

OTHER PUBLICATIONS

Search Report under Section 17(5) dated Nov. 21, 2013, International Application No. GB1308638.4, 4 pages.

(Continued)

*Primary Examiner* — Kim Nguyen
(74) *Attorney, Agent, or Firm* — Stephen R. Tkacs; Stephen J. Walder, Jr.; Lisa J. Ulrich (57) ABSTRACT

A mechanism is provided for two-directional biometric matching. The mechanism receives a first biometric record and a second biometric record for matching. The mechanism performs a first matching process using a matching algorithm of the first record to the second record to obtain a first matching outcome. The mechanism performs a second matching process using the same matching algorithm of the first matching process, wherein the second record is matched to the first record to obtain a second matching outcome. The mechanism compares the first and second matching outcomes to determine if there is a difference in outcome.

20 Claims, 5 Drawing Sheets

(56) References Cited

U.S. PATENT DOCUMENTS

| | | | |
|---|---|---|---|
| 2012/0082348 A1* | 4/2012 | Fukuda | G06K 9/00375 |
| | | | 382/115 |
| 2012/0087549 A1 | 4/2012 | Benini | |
| 2012/0188056 A1 | 7/2012 | Sahin et al. | |
| 2012/0328197 A1 | 12/2012 | Sanderson et al. | |
| 2014/0241597 A1* | 8/2014 | Leite | G06K 9/00979 |
| | | | 382/125 |
| 2014/0340483 A1* | 11/2014 | Ritter | G01N 21/6458 |
| | | | 348/46 |
| 2014/0344260 A1* | 11/2014 | Waggett | G06F 17/30032 |
| | | | 707/723 |
| 2015/0010230 A1* | 1/2015 | Zhou | G06K 9/00536 |
| | | | 382/154 |

OTHER PUBLICATIONS

"A Novel Way of Training a Biometric Engine by Staggering the Training Beyond the Enrollment Process", www.ip.com, ip.com, No. IPCOM000214923D, Feb. 14, 2012, 7 pages.

Chen, Liqun et al., "A Trusted Biometric System", Hewlett-Packard Laboratories Bristol, Jul. 15, 2002, 12 pages.

Gamassi, Marco et al., "Accuracy and Performance of Biometric Systems", Instrumentation and Measurement Technology Conference, 2004. IMTC 04. Proceedings of the 21st IEEE, May 18-20, 2004, 6 pages.

Gamassi, M et al., "Quality Assessment of BIometric Systems: A Comprehensive Perspective Based on Accuracy and Performance Measurement", IEEE Transactions on Instrumentation and Measurement, vol. 54, No. 4, August 2005, 8 pages.

\* cited by examiner

TWO-DIRECTIONAL BIOMETRIC MATCHING

BACKGROUND

This invention relates to the field of biometric matching. In particular, the invention relates to providing two-directional biometric matching.

Biometric systems identify people by their physical characteristics. Biometric identifiers are distinctive, measurable characteristics used to describe individuals.

There are two main types of applications of biometric identification. A first application is for identification of an individual. A biometric system performs a one-to-many comparison against a database of existing biometric data. The system attempts to match the new biometric sample to stored biometric records of known individuals. A successful identification is achieved if the comparison of the biometric sample to a record in the database falls within a previously set threshold.

The second application of biometric identification is for authentication or verification of an individual, also known as one-to-one matching. In this case, the biometric system performs a comparison of a biometric input to a single biometric record in order to verify that the individual is the person they claim to be. The biometric record may be generated during an enrolment or registration process.

The most common forms of biometrics used in automated systems include: fingerprint, face, voice, iris, signature, hand geometry, vein patterns, etc. Biometric data is generated by acquiring the biometric information using a sensor and refining the information as a record or template in the form of an image, signal or data.

Biometric matching systems provide the capability to match two biometric records of biometric characteristics and provide a score based on their degree of similarity. Two records from the same person should have a high degree of similarity and score highly while two records from different individuals should have a lower score and score low.

Each record is, however, captured under different conditions and also different individuals have characteristics that vary statistically. The outcome of this is that when two individual records of characteristics are matched against a large background population (100's of millions for a national ID scheme) gathered using different equipment and environmental conditions, a whole range of scores is seen. These scores tend to exhibit a 'normal' distribution around a matched and non-matched score such that there is a region of overlap.

Systems are tuned to set a threshold score, which determines a 'match' decision. This does mean that there are some 'false matches' and 'false non-matches' present in the results of their operation around this threshold score. Current systems cannot however determine which individual pairs are potentially false declarations.

The aim of biometric matching system vendors is to produce a system that minimizes the populations of 'false matches' and 'false non-matches' present in the results of their operation. This is an active research topic and results in matching algorithms that are more complex and layered in their operation.

Therefore, there is a need in the art to address the aforementioned problems.

SUMMARY

According to one illustrative embodiment, there is provided a method for two-directional biometric matching, comprising: receiving a first biometric record and a second biometric record for matching; carrying out a first matching process using a matching algorithm of the first record to the second record to obtain a first matching outcome; carrying out a second matching process using the same matching algorithm of the first matching process, wherein the second record is matched to the first record to obtain a second matching outcome; and comparing the first and second matching outcomes to determine if there is a difference in outcome.

According to another illustrative embodiment, there is provided a system for two-directional biometric matching, comprising: a matching system for receiving a first biometric record and a second biometric record for matching; a first direction matching component for carrying out a first matching process using a matching algorithm of the first record to the second record to obtain a first matching outcome; a second direction matching component for carrying out a second matching process using the same matching algorithm of the first matching process, wherein the second record is matched to the first record to obtain a second matching outcome; and a first and second direction comparing component for comparing the first and second matching outcomes to determine if there is a difference in outcome.

According to another illustrative embodiment, there is provided a computer program product for two-directional biometric matching, the computer program product comprising: a computer readable storage medium readable by a processing circuit and storing instructions for execution by the processing circuit for performing a method according to the method illustrative embodiment outlined above.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

DETAILED DESCRIPTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Method and system are provided for symmetrical biometric matching. A first biometric matching may be carried out by comparing a first record to a second record. A second biometric matching may be carried out using the same matching algorithm and comparing the second record to the first record. Any asymmetrical result of the biometric matching will result in different match declarations from the first and second biometric matching. If the first and second match declarations are different, further analysis may be performed of the first and second records. In this way, inaccuracy in a biometric identification system may be detected.

Each pair of records to be matched are run through a biometric matching system in two directions and any pair that have a different determination may be flagged for further investigation. This enables the detection and handling of a population of 'false' declarations that would otherwise be missed. This would lead to less costly and less potentially dangerous identification decisions being made by biometric matching systems.

Some matching algorithms are asymmetrical in that if a first record is matched to a second record, the result is not identical to the second record being matched to the first record. If record A is matched against record B then a different declaration of whether a match has occurred may be generated compared to whether record B is matched to record A.

A matching algorithm system may use a layered set of algorithms with the aim of matching two records very quickly. Therefore, a series of algorithms may be used with trigger points in the chain that may be activated by a result. For example, a strong similarity result at a given point in an algorithm may take a short-cut branch through the system, whereas a marginal match may take a different path.

The order of the records being matched may trigger different paths through the matching algorithm system using different code paths. This may result in the asymmetrical results of the matching of a pair of records in different directions.

There are many types of matching algorithms that may be used, independently or in combination with other algorithms. Examples of algorithms include: Principal Component Analysis, Independent Component Analysis, Linear Discriminant Analysis, Evolutionary Pursuit, Elastic Bunch Graph Matching, Kernel Methods, Trace Transform, Active Appearance Model, Bayesian Framework, Support Vector Machine, Hidden Markov Models, Boosting and Ensemble Solutions.

Known matching systems incorporating matching algorithms include: MorphoBiometric Engine (this is the trademark of the solution from Safran Morpho) which may be used for fingerprint matching or face matching; NEC National/State ID Solution (produced by NEC Security Solutions) for fingerprint matching; and Cognitec Facial Image Database Search.

If the match declaration is asymmetrical, then it is possible to identify a population that can be declared as 'uncertain' and subject to further analysis (for example, potentially manual) and treating this population differently can improve the overall performance of the matching system.

Current biometric systems have the biometric matching reduced to a simple service that is provided with a pair of records, such as images, to match. The described method may send each match to the matcher twice and flag up the declaration of a match or non-match for each pair. Those with two match decisions that do not agree would be flagged for further investigation and as potential errors.

Figure 1:
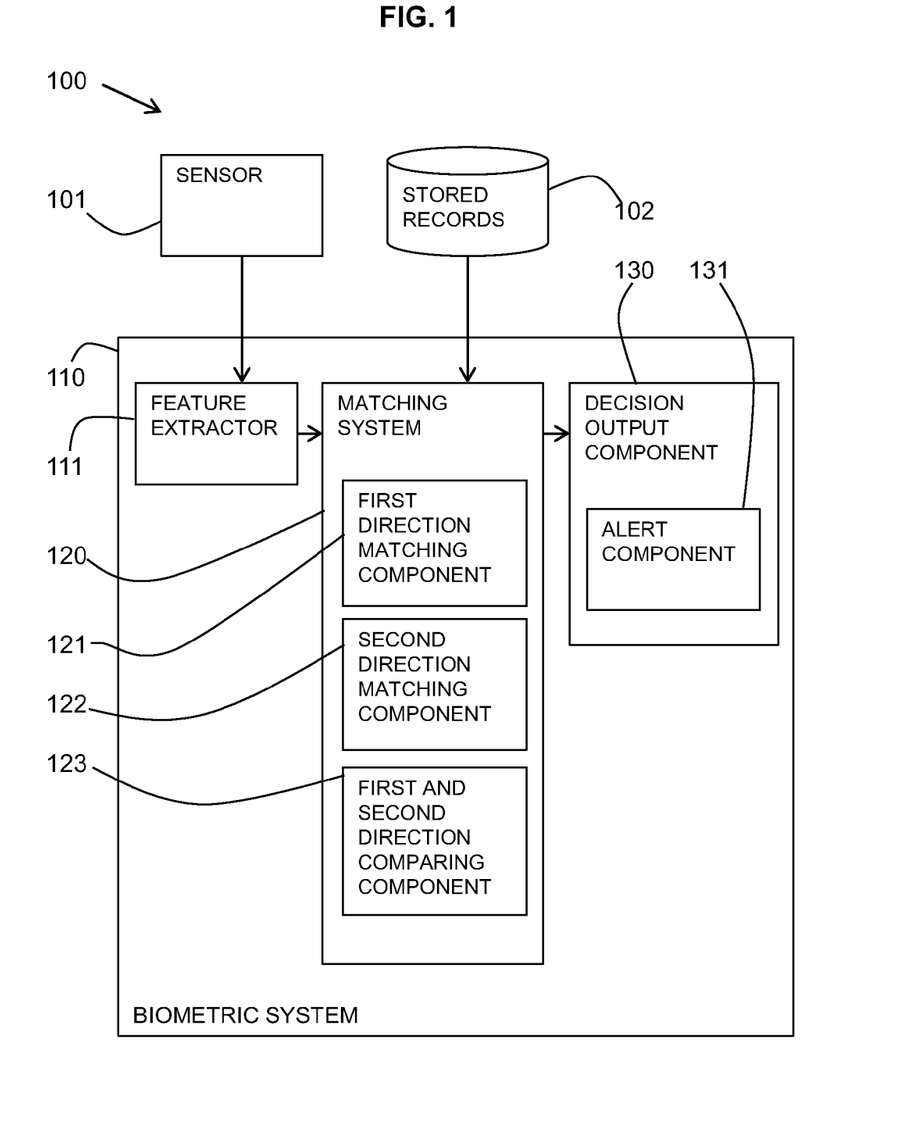
FIG. 1 is block diagram of an example of a system for two-directional biometric matching in accordance with an illustrative embodiment.

Referring to FIG. 1, a block diagram shows an example embodiment of the described system 100.

A system 100 is described in the form of a biometric system 110 which may be used for identification of an individual or verification/authentication of an individual. In both cases an individual may have his biometric information determined by a sensor 101. The sensor 101 may be local to the biometric system 110 of remote from it. The information from the sensor 101 may be received at a feature extractor of a biometric system 110. The feature extractor 111 may extract the relevant biometric data to form a biometric record for the individual.

Existing biometric records for individuals may be stored 102 in a data store which may be local to the biometric system 110 or remote from it.

A matching system 120 may be provided which receives as input a sample record from the feature extractor and one or more stored records from the data store 102 for comparison with the sample record. The matching system 120 may be used for identification with the sample record being compared to multiple stored records, one at a time to find a match. The matching system 120 may also be used for verification with the sample record being compared to a single stored record of a known individual.

In the matching system 120, two records may be compared by a matching algorithm of the matching system 120. The described matching system 120 may include a first direction matching component 121 and a second direction matching component 122. The first direction matching component 121 takes the two records to be compared and compares them in a first direction, i.e. sample record to stored record. The second direction matching component 122 takes the same two records to be compared and compares them in a second direction, i.e. stored record to sample record.

The matching system 120 may include a first and second direction comparing component 123 for comparing the results of the first direction matching component 121 and the second direction matching component 122.

In one embodiment, the results of each direction matching component 121, 122 may be compared to a threshold value for a match. If the two results do not concur as to a match or non-match, then an alert component 131 in a decision output component 130 of the biometric system 110 may be activated.

In another embodiment, the comparing component 123 may determine if the difference in matching score of the two direction matching components 121 is above a predefined threshold and the alert component 131 may be activated if the difference is above the threshold.

The alert component 131 may indicate to a user that further investigation into the two records is required due to the asymmetrical results obtained.

Figure 2:
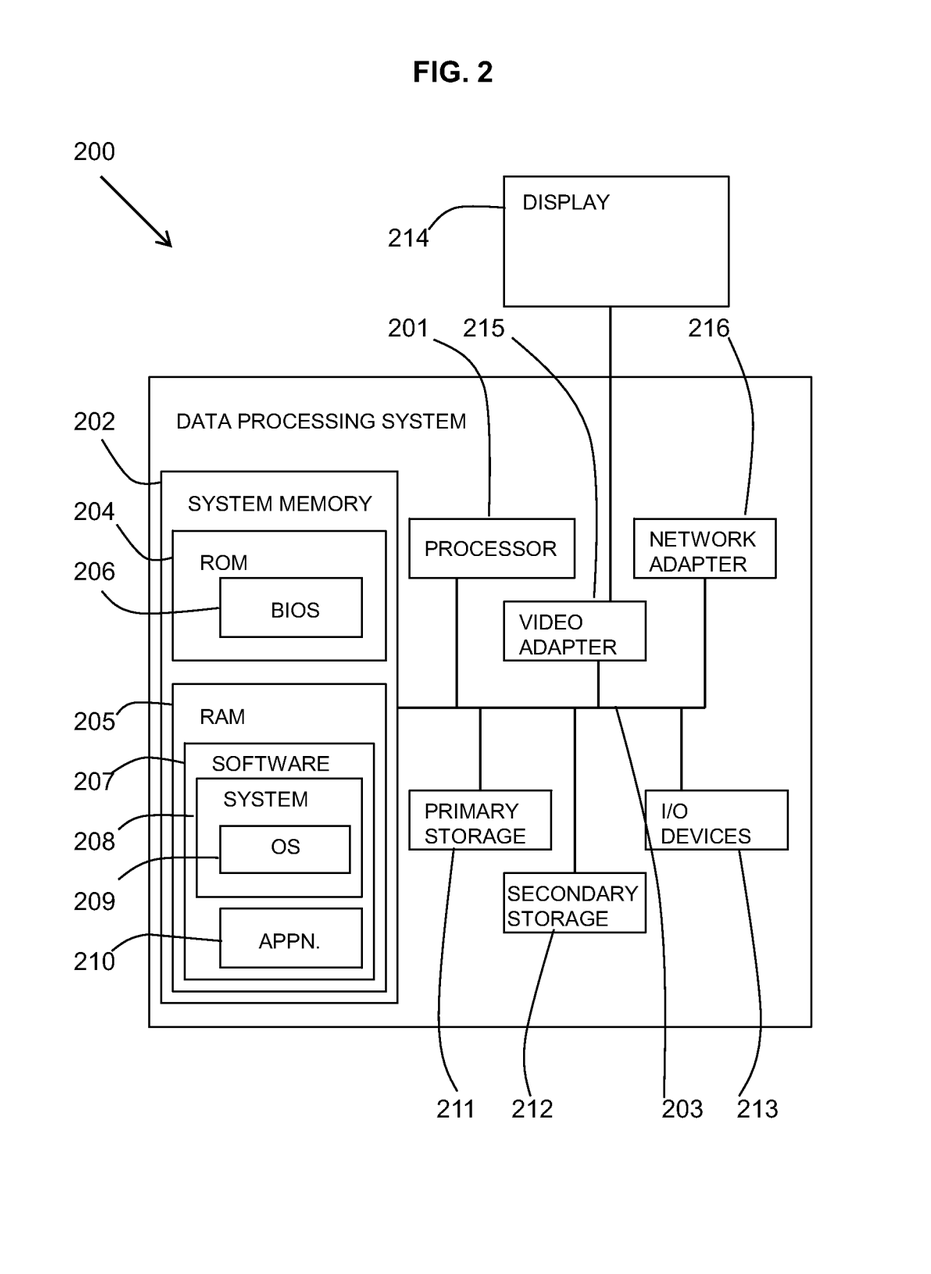
FIG. 2 is a block diagram of a computer system in which aspects of the illustrative embodiments may be implemented.

Referring to FIG. 2, an exemplary system for implementing aspects of the illustrative embodiments includes a data processing system 200 suitable for storing and/or executing program code including at least one processor 201 coupled directly or indirectly to memory elements through a bus system 203. The memory elements may include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 may be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Figure 3A:
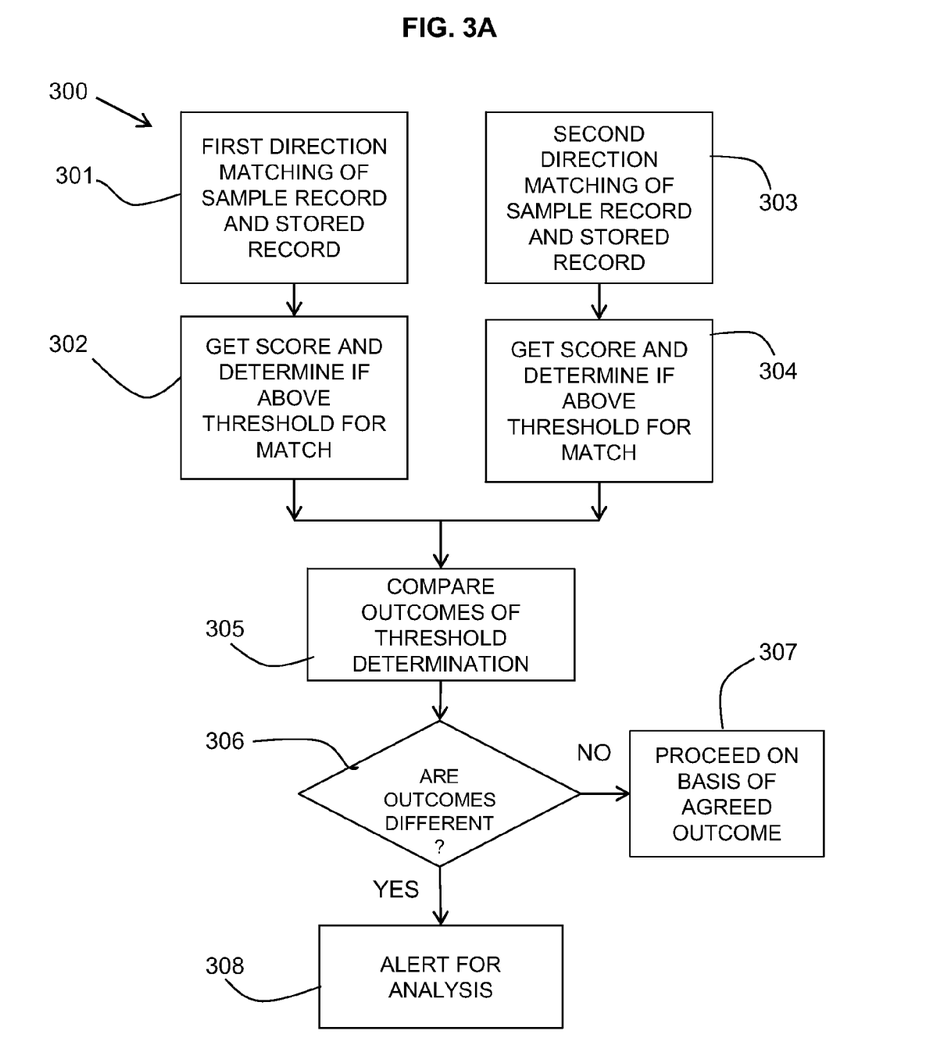
FIG. 3A is a flow diagram of two-directional biometric matching in accordance with one illustrative embodiment.

Referring to FIG. 3A, a flow diagram 300 shows a first embodiment of the described method.

A sample record and a stored record may be matched 301 in a first direction by a matching algorithm. A score for the match may be obtained 302 and it may be determined if the score is above a threshold for a match providing a first match declaration of match or non-match.

Either simultaneously or sequentially, the same pair of sample record and stored record may be matched 303 in a second direction by a matching algorithm. A score for the match may be obtained 304 and it may be determined if the score is above a threshold for a match providing a second match declaration of match or non-match.

The outcomes of the threshold determination 302, 304 of the first and second direction matching 301, 303 may be compared 305. It is determined 306 if both threshold determinations 302, 304 concur in a match or non-match or if the outcomes are different. If the outcomes are not different, then the method may proceed 307 on the basis of the agreed outcome. However, if the outcomes are different, then an alert for further analysis may be generated 308.

Figure 3B:
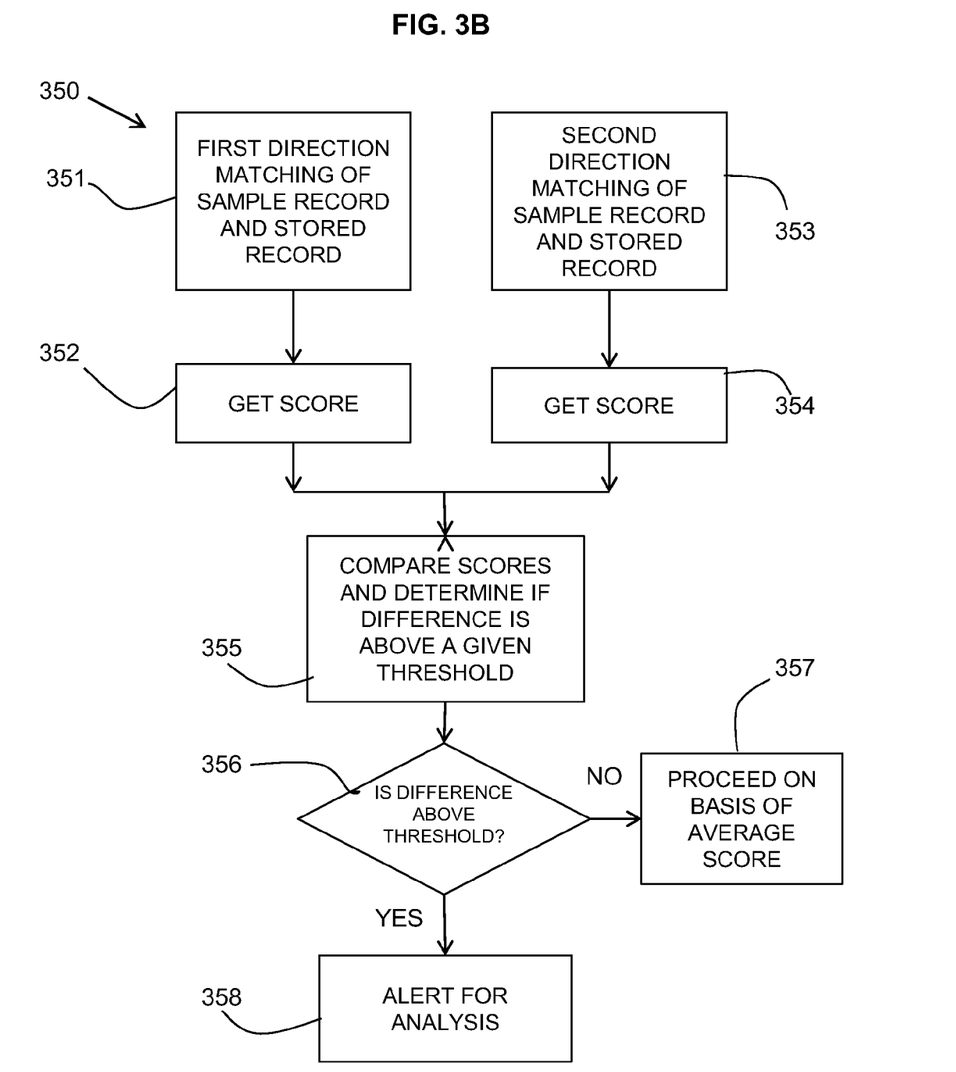
FIG. 3B is a flow diagram of two-directional biometric matching in accordance with another illustrative embodiment.

Referring to FIG. 3B, a flow diagram 350 shows a second embodiment of the described method.

A sample record and a stored record may be matched 351 in a first direction by a matching algorithm. A score for the match may be obtained 352.

Either simultaneously or sequentially, the same pair of sample record and stored record may be matched 353 in a second direction by a matching algorithm. A score for the match may be obtained 354.

The outcomes of the scores 352, 354 of the first and second direction matching 351, 353 may be compared 355 to determine 356 if the difference in scores 352, 354 is above a given threshold.

If the difference in scores is not above the threshold, then the method may proceed 357 on the basis of the score outcome. However, if the different is above the threshold then an alert for further analysis may be generated 358. This second embodiment, will produce an alert even if the score outcomes of match or non-match are the same, but the difference in scores is sufficient to raise an alert.

Figure 4:
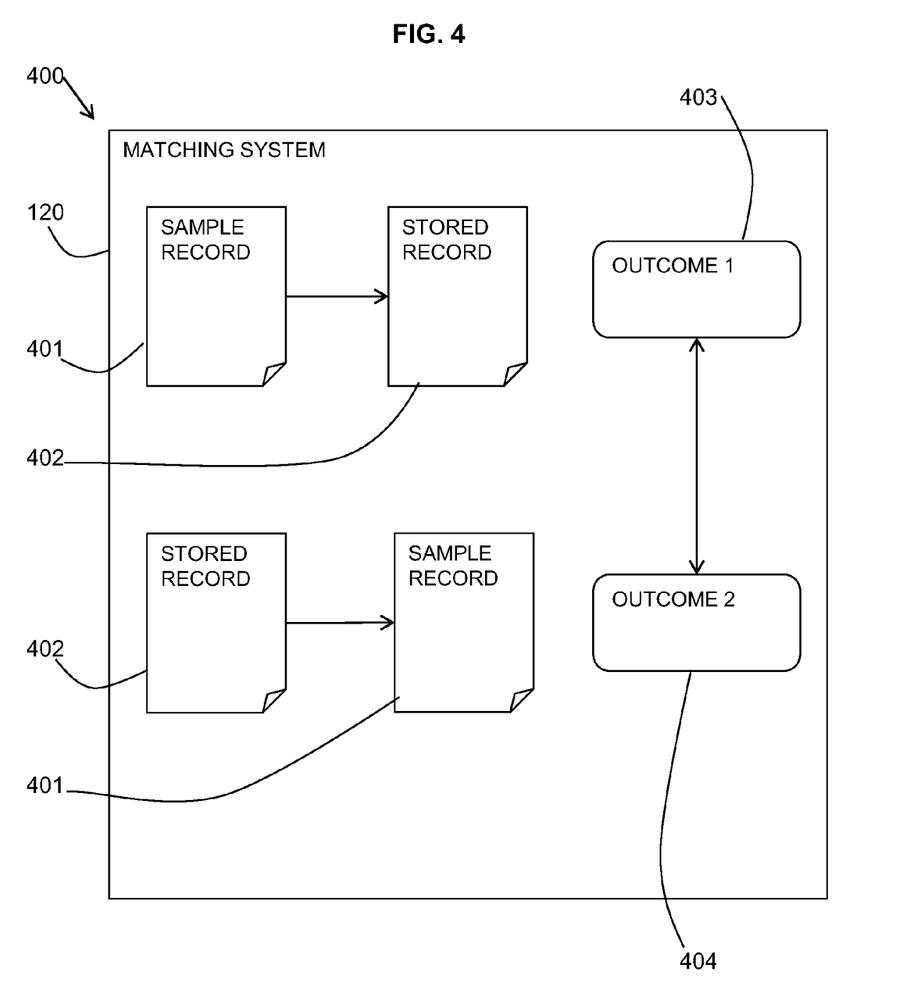
FIG. 4 is a schematic diagram of two-directional biometric matching in accordance with an illustrative embodiment.

Referring to FIG. 4, a schematic diagram 400 shows the described operation of the matching system 120.

A first matching may be carried out by a sample record 401 being compared to a stored record 402 and a first outcome may be obtained, outcome 1 403. Either at the same time or before or after the first matching, a second matching may be carried out by the stored record 402 being compared to the sample record 401 and a second outcome may be obtained, outcome 2 404.

The first outcome 1 403 and the second outcome 2 404 may be compared to determine if there is a difference in the outcomes which should be investigated further due to a degree of uncertainty in the results.

The match population may take the form of a distribution curve and a non-match population may take the form of a second distribution curve. The two distribution curves' tails may overlap which gives an area of uncertainty. A defined threshold for asymmetry may select the records within this area of uncertainty that are given further analysis.

As there is often a limited amount of time to process records for matching, any means of identifying record pairs for detailed analysis is useful. The record pairs may be displayed to a user side by side for manual evaluation.

Previously the operational speed and use of processing overheads of matching has been prohibitive to carrying out additional processing of records. The current matching algorithms are computationally quicker enabling multiple directional checking to be feasible.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method for two-directional biometric matching, comprising:

receiving a first biometric record and a second biometric record for matching, wherein the first biometric record is a sample biometric record provided from a biometric sensor and the second biometric record is a stored biometric record;

performing a first matching process using an asymmetric matching algorithm to match the first biometric record to the second biometric record to obtain a first matching outcome, wherein the asymmetric matching algorithm comprises a layered series of algorithms comprising at least one trigger point, wherein a strong similarity result at the trigger point activates a short-cut branch through the layered series of algorithms;

performing a second matching process using the asymmetric matching algorithm of the first matching process to match the second biometric record to the first biometric record to obtain a second matching outcome; and comparing the first matching outcome and the second matching outcome to determine if there is a difference in outcome.

2. The method as claimed in claim 1, further comprising:
providing an alert responsive to determining the first matching outcome and the second matching outcome are different.

3. The method as claimed in claim 1, wherein comparing the first matching outcome and the second matching outcome comprises:
generating a first match declaration based on the first matching outcome;
generating a second match declaration based on the second matching outcome; and
determining whether the first match declaration and the second match declaration agree.

4. The method as claimed in claim 1, wherein comparing the first matching outcome and the second matching outcome comprises:
generating a first matching score for the first matching outcome;
generating a second matching score for the second matching outcome; and
determining whether a difference between the first matching score and the second matching score is greater than a predefined threshold.

5. The method as claimed in claim 1, further comprising:
providing further analysis of the first biometric record and the second biometric record responsive to determining the first biometric record and the second biometric record are different.

6. The method as claimed in claim 1, wherein the first matching process and the second matching process are performed simultaneously.

7. The method as claimed in claim 1, wherein the first biometric record and the second biometric record are fingerprint, face, voice, iris, signature, hand geometry, or vein pattern records.

8. A system for two-directional biometric matching, comprising:
a processor; and
a memory coupled to the processor, wherein the memory comprises instructions which, when executed by the processor, cause the processor to:
receive a first biometric record and a second biometric record for matching, wherein the first biometric record is a sample biometric record provided from a biometric sensor and the second biometric record is a stored biometric record;
perform a first matching process using an asymmetric matching algorithm to match the first biometric record to the second biometric record to obtain a first matching outcome, wherein the asymmetric matching algorithm comprises a layered series of algorithms comprising at least one trigger point, wherein a strong similarity result at the trigger point activates a short-cut branch through the layered series of algorithms;
perform a second matching process using the asymmetric matching algorithm of the first matching process to match the second biometric record to the first biometric record to obtain a second matching outcome; and
compare the first matching outcome and the second matching outcome to determine if there is a difference in outcome.

9. The system as claimed in claim 8, wherein the instructions further cause the processor to:
provide an alert responsive to determining the first matching outcome and the second matching outcome are different.

10. The system as claimed in claim 8, wherein the comparing the first matching outcome and the second matching outcome comprises:
generating a first match declaration based on the first matching outcome;
generating a second match declaration based on the second matching outcome; and
determining whether the first match declaration and the second match declaration agree.

11. The system as claimed in claim 8, wherein comparing the first matching outcome and the second matching outcome comprises:
generating a first matching score for the first matching outcome;
generating a second matching score for the second matching outcome; and
determining whether a difference between the first matching score and the second matching score is greater than a predefined threshold.

12. The system as claimed in claim 8, wherein the instructions further cause the processor to:
provide further analysis of the first biometric record and the second biometric record responsive to determining the first biometric record and the second biometric record are different.

13. The system as claimed in any claim 8, wherein the first matching process and the second matching process operate on a pair of records simultaneously.

14. The system as claimed in claim 8, wherein the first biometric record and the second biometric records are fingerprint, face, voice, iris, signature, hand geometry, or vein pattern records.

15. A computer program product for two-directional biometric matching, the computer program product comprising:
a non-statutory computer readable storage medium readable by a processing circuit and storing instructions for execution by the processing circuit to:
receive a first biometric record and a second biometric record for matching, wherein the first biometric record is a sample biometric record provided from a biometric sensor and the second biometric record is a stored biometric record;
perform a first matching process using an asymmetric matching algorithm to match the first biometric record to the second biometric record to obtain a first matching outcome, wherein the asymmetric matching algorithm comprises a layered series of algorithms comprising at least one trigger point, wherein a strong similarity result at the trigger point activates a short-cut branch through the layered series of algorithms;

perform a second matching process using the asymmetric matching algorithm of the first matching process to match the second biometric record to the first biometric record to obtain a second matching outcome; and compare the first matching outcome and the second matching outcome to determine if there is a difference in outcome.

16. The computer program product as claimed in claim 15, wherein comparing the first matching outcome and the second matching outcome comprises:

generating a first match declaration based on the first matching outcome;

generating a second match declaration based on the second matching outcome; and determining whether the first match declaration and the second match declaration agree.

17. The computer program product as claimed in claim 15, wherein comparing the first matching outcome and the second matching outcome comprises:

generating a first matching score for the first matching outcome;

generating a second matching score for the second matching outcome; and determining whether a difference between the first matching score and the second matching score is greater than a predefined threshold.

18. The computer program product as claimed in claim 15, wherein the processing circuit further executes the instructions to:

providing an alert responsive to determining the first matching outcome and the second matching outcome are different.

19. The computer program product as claimed in claim 15, wherein the processing circuit further executes the instructions to:

providing further analysis of the first biometric record and the second biometric record responsive to determining the first biometric record and the second biometric record are different.

20. The computer program product as claimed in claim 15, wherein the first biometric record and the second biometric record are fingerprint, face, voice, iris, signature, hand geometry, or vein pattern records.

* * * * *